(12) United States Patent
Wu et al.

(10) Patent No.: US 11,106,628 B2
(45) Date of Patent: Aug. 31, 2021

(54) METHOD, DEVICE AND COMPUTER PROGRAM PRODUCT FOR STORING METADATA

(71) Applicant: EMC IP Holding Company LLC, Hopkinton, MA (US)

(72) Inventors: Aaron Yurun Wu, Shanghai (CN); Gary Jialei Wu, Shanghai (CN); Ao Sun, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 180 days.

(21) Appl. No.: 16/442,318

(22) Filed: Jun. 14, 2019

(65) Prior Publication Data

US 2020/0142861 A1 May 7, 2020

(30) Foreign Application Priority Data

Nov. 2, 2018 (CN) .......................... 201811302936.4

(51) Int. Cl.
| | |
|---|---|
| *G06F 16/00* | (2019.01) |
| *G06F 16/14* | (2019.01) |
| *G06F 9/50* | (2006.01) |
| *G06F 16/182* | (2019.01) |
| *G06F 16/16* | (2019.01) |
| *G06F 16/23* | (2019.01) |

(52) U.S. Cl.
CPC ............ *G06F 16/144* (2019.01); *G06F 9/505* (2013.01); *G06F 16/164* (2019.01); *G06F 16/182* (2019.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 8,938,416 B1* | 1/2015 | Cole | ................. | G06F 16/24556 707/607 |
| 9,497,136 B1* | 11/2016 | Ramarao | ............... | G06F 9/5072 |
| 2012/0317579 A1* | 12/2012 | Liu | ..................... | G06F 11/1438 718/104 |
| 2014/0075032 A1* | 3/2014 | Vasudevan | .......... | H04L 41/5048 709/226 |

(Continued)

*Primary Examiner* — Bai D Vu
(74) *Attorney, Agent, or Firm* — Amin, Turocy & Watson, LLP (57) ABSTRACT

In an example, a method comprises determining, based on a set of metadata items to be stored, a first sequence and a second sequence, wherein the first sequence and the second sequence each include a plurality of key-value pairs, each key-value pair including a metadata item from the set of metadata items and a keyword corresponding to the metadata item in the set. The method also comprises causing a first co-routine to utilize available computing resources to process the first sequence. The method further comprises in response to an amount of computing resources available for the first co-routine to process the first sequence being below a first threshold, causing a second co-routine to process the second sequence, wherein the second co-routine is different from the first co-routine. This method can increase the utilization rate of the processor and more rapidly stores the metadata into the external storage device.

20 Claims, 8 Drawing Sheets

(56) References Cited

U.S. PATENT DOCUMENTS

| | | | |
|---|---|---|---|
| 2014/0289225 A1* | 9/2014 | Chan | H04L 67/1095 |
| | | | 707/722 |
| 2015/0134602 A1* | 5/2015 | Nicholas | G06F 16/23 |
| | | | 707/609 |
| 2015/0324406 A1* | 11/2015 | Brewer | G06F 16/248 |
| | | | 707/722 |
| 2017/0006135 A1* | 1/2017 | Siebel | H04L 69/40 |
| 2019/0227853 A1* | 7/2019 | Huang | G06F 9/5083 |
| 2020/0110540 A1* | 4/2020 | Delaney | G06F 3/061 |

* cited by examiner

Fig. 8

METHOD, DEVICE AND COMPUTER PROGRAM PRODUCT FOR STORING METADATA

RELATED APPLICATION

The present application claims the benefit of priority to Chinese Patent Application No. 201811302936.4, filed on Nov. 2, 2018, which application is hereby incorporated into the present application by reference herein in its entirety.

FIELD

Embodiments of the present disclosure generally relate to the field of data management, and more specifically, to a method, a device and a computer program product for storing metadata.

BACKGROUND

As the computer applications increase, users process different tasks through computers, which accordingly results into growing data in the computer applications. In addition, it is increasingly important to rationally store the user data with large capacity storage devices. Therefore, the storage device providers offer various types of storage devices to store massive data. Users can conveniently store and read the data via these storage devices.

The amount of metadata for the user data also increases as user data increases. Therefore, the storage of the metadata becomes more and more important. Accordingly, the storage device providers design various storage structures for storing the metadata. On the account of the importance of the metadata, how to reasonably store the metadata has become an issue to be addressed.

SUMMARY

Embodiments of the present disclosure provide method, device and computer program product for storing metadata.

In accordance with a first aspect of the present disclosure, there is provided a method of storing metadata. The method comprises determining, based on a set of metadata items to be stored, a first sequence and a second sequence, wherein the first sequence and the second sequence each include a plurality of key-value pairs, each key-value pair including a metadata item from the set of metadata items and a keyword corresponding to the metadata item. The method also comprises causing a first co-routine to utilize available computing resources to process the first sequence. The method further comprises in response to an amount of computing resources available for the first co-routine to process the first sequence being below a first threshold, causing a second co-routine to process the second sequence, wherein the second co-routine is different from the first co-routine.

In accordance with a second aspect of the present disclosure, there is provided an electronic device for storing metadata. The electronic device comprises a processor; and a memory having computer program instructions stored thereon, the processor executing the computer program instructions in a memory to control the electronic device to perform acts comprising: determining, based on a set of metadata items to be stored, a first sequence and a second sequence, wherein the first sequence and the second sequence each include a plurality of key-value pairs, each key-value pair including a metadata item from the set of metadata items and a keyword corresponding to the metadata item; causing a first co-routine to utilize available computing resources to process the first sequence; and in response to an amount of computing resources available for the first co-routine to process the first sequence being below a first threshold, causing a second co-routine to process the second sequence, wherein the second co-routine is different from the first co-routine.

In accordance with a third aspect of the present disclosure, there is provided a computer program product. The computer program product is tangibly stored on a non-volatile computer-readable medium and comprises machine-executable instructions which, when executed, cause a machine to perform steps of the method according to the first aspect of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

In each drawing, same or corresponding reference signs indicate same or corresponding parts.

DETAILED DESCRIPTION OF EMBODIMENTS

The embodiments of the present disclosure will be described in more details with reference to the drawings. Although the drawings illustrate some embodiments of the present disclosure, it should be appreciated that the present disclosure can be implemented in various manners and should not be limited to the embodiments explained herein. On the contrary, the embodiments are provided to understand the present disclosure in a more thorough and complete way. It should be appreciated that drawings and embodiments of the present disclosure are only for exemplary purposes rather than restricting the protection scope of the present disclosure.

In the descriptions of the embodiments of the present disclosure, the term "includes" and its variants are to be read as open-ended terms that mean "includes, but is not limited to." The term "based on" is to be read as "based at least in part on." The terms "one embodiment" and "this embodiment" are to be read as "at least one embodiment." The terms "first", "second" and so on can refer to same or different objects. The following text also can comprise other explicit and implicit definitions.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and is not intended for limiting the scope of the present disclosure in any manner.

For the storage regarding the metadata of the user data, the metadata from the memory usually is stored into an external storage device. A particular data structure is used in the external storage device to store the metadata for its read and acquisition. A single thread is often utilized to store the metadata. However, during the procedure of storing the metadata, data blocks in data pages in the external storage device are firstly read into a storage engine and the metadata to be stored are then updated to the data blocks, which are subsequently flushed to the external storage device.

The above procedure involves interactions with the external storage device. However, when the data are read from or written into the external storage device, the processor cannot be fully exploited during the Input/Output procedure because the procedure is relatively slow. Therefore, the speed for storing the metadata into the external storage device is lowered and the utilization rate of the computing resources is also reduced.

In order to increase the speed for storing the metadata to the external storage device, multithreading is usually employed to parallel processing the storage of the metadata. However, because the parallel threads compete for resources during data processing, it is required to lock the data pages to be processed by two threads for the sake of data consistency. The competition causes the computing resources to excessively process these transactions, which accordingly reduces the benefits brought by parallel processing. Therefore, parallel multithreading also has the problems like low processor utilization rate and slow storage speed.

To address the above problems, the present disclosure proposes a method for storing metadata, in which co-routines are adopted to process the metadata to be stored. During the processing, a plurality of metadata to be stored and keywords of the metadata are divided into a plurality of sequences, which are subsequently allocated to a plurality of co-routines for processing. When the co-routines are processing these sequences, a data block associated with a keyword of a first metadata in the sequence is identified as a critical data block. The co-routine updates the data block with metadata and keywords of the metadata, and stores non-critical data blocks into the external storage device. After completing the storage of the non-critical data blocks, the co-routines uniformly store the critical data blocks. A further co-routine is called via this method when a co-routine inputs/outputs the data, such that the co-routine can fully exploit the computing resources, which enhances the efficiency of storing the metadata to the external storage device and further increases the speed of data processing of the entire storage system.

Figure 1:
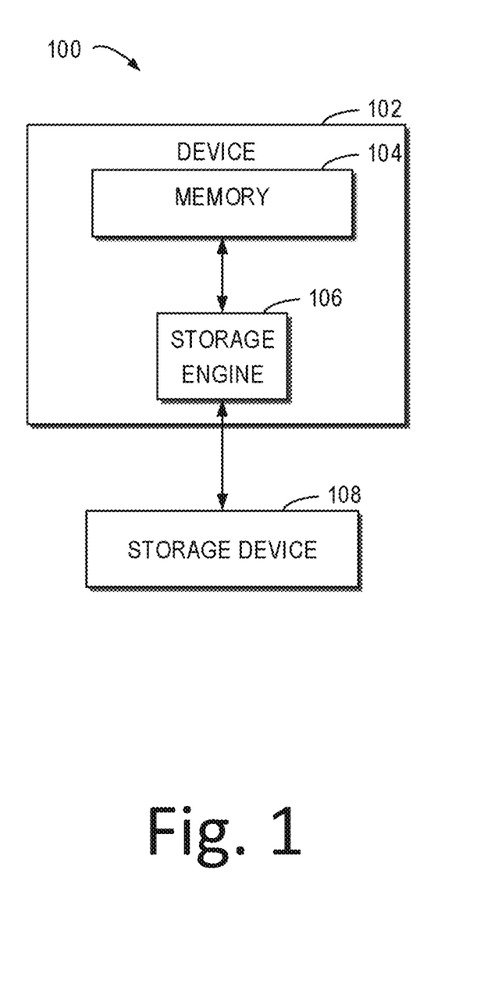
FIG. 1 illustrates a schematic diagram of an example environment 100 where device and/or method according to embodiments of the present disclosure can be implemented.

FIG. 1 graphically illustrates a schematic diagram of an example environment 100 where device and/or method according to embodiments of the present disclosure can be implemented.

The example environment 100 includes a device 102, which is provided for obtaining the metadata for the user data and storing the metadata of the user data on a memory 104.

The device 102 can be implemented as any types of devices, including but not limited to, mobile phone (e.g., smartphone), laptop computer, Portable Digital Assistant (PDA), electronic book (e-book) reader, portable game console, portable media player, game machine, Set-Top-Box (STB), smart television (TV), personal computer, on-board computer (such as navigation unit) and the like.

The device 102 includes the memory 104 for saving the metadata. When the amount of the metadata saved in the memory 104 exceeds a predetermined amount, the metadata in the memory 104 are transferred to a storage device 108. In one example, the metadata is stored inside the memory 104 in the form of key-value pairs. The values in the key-value pairs correspond to the metadata and the keys are keywords acquired from the metadata. Alternatively or additionally, the key-value pairs stored in the memory 104 are sorted by the size of the key and then stored. The above examples are provided only for the purpose of explaining the present disclosure, rather than specifically restricting the present disclosure. The metadata can be stored within the memory 104 in any suitable ways.

The device 102 also includes a storage engine 106, which is used to store the data inside the memory 104 to the storage device 108. The storage engine 106 can perform a process consisting of a plurality of co-routines, such that the plurality of co-routines cooperates with each other in a non-preemptive way to complete the storage of the metadata.

The storage engine 106 stores the metadata into the storage device 108 in various data structures. In one example, the data structure is a tree structure. Alternatively or additionally, the tree structure can be B+tree structure or B−tree structure. The above examples are provided only for the purpose of explaining the present disclosure, rather than restricting it. The metadata can be stored in any suitable data structures.

Figure 2:
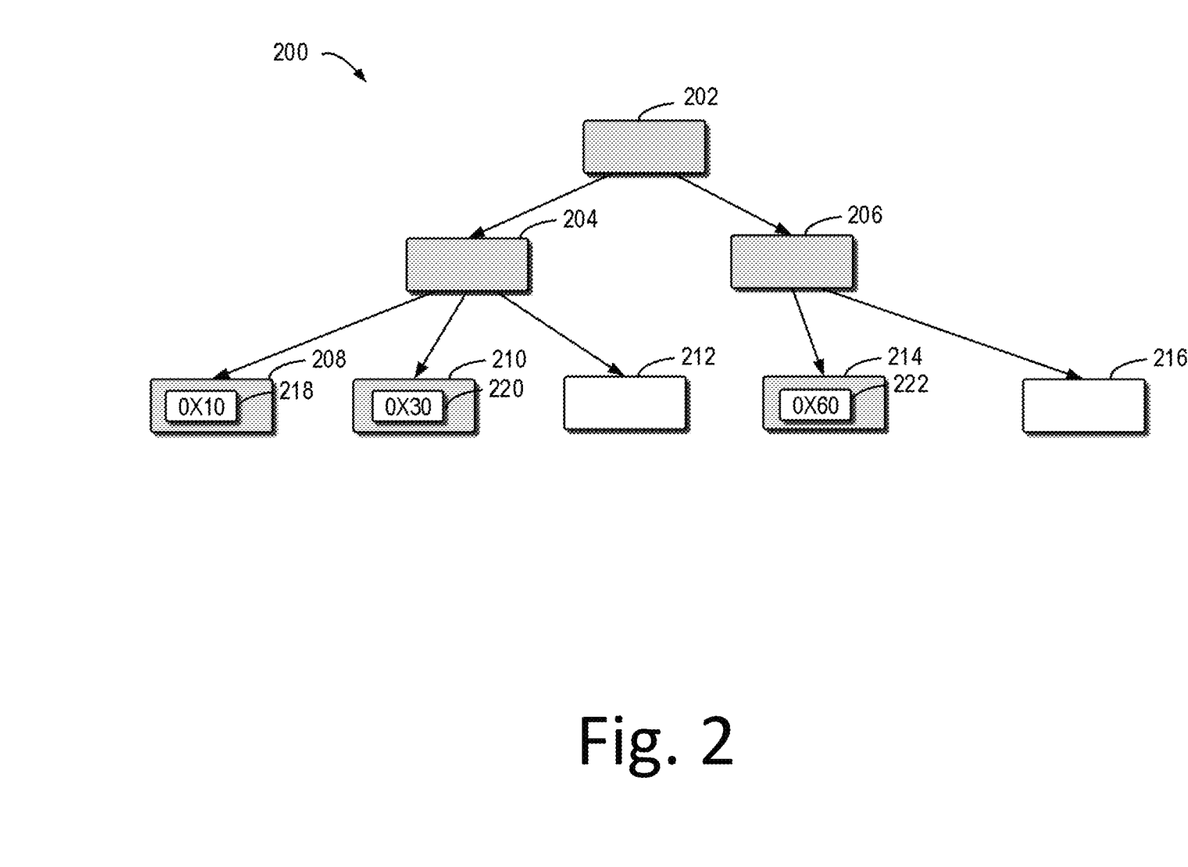
FIG. 2 illustrates a schematic diagram 200 for showing storage positions of the metadata in accordance with embodiments of the present disclosure.

The storage procedure, which is depicted by taking the B+tree structure as an example, includes three phases: path searching, data block updating and data block refreshing. Path searching is to find the path from the root page down to the very leaf page that encompasses the searching keyword.

According to FIG. 2, the tree structure comprises root page 202, index pages 204 and 206 and leaf pages 208, 210, 212, 214 and 216. The key 218 includes 0x10 pointing to the leaf page 208; the key 220 includes 0x30 pointing to the leaf page 210; and key 222 includes 0x06 pointing to the leaf page 216. Data block updating is to insert, update or delete the key values in the data block of the page. When the size of the data block is above or below a threshold, the pages are split or combined. The inserted data block is marked as dirty, e.g., pages 208, 210 and 214 in FIG. 2. Data block refreshing is to write the dirty data blocks into the pages of the disks and updates the address reference of the dirty data blocks in its parent page.

In FIG. 2, when the data blocks are stored into the pages 208 and 210, new addresses of the two pages are inserted into their common parent pages. The first and the third phases require time-consuming disk Input/Output (I/O) operations while the second phase needs operations inside the memory 104. The operations in the second phase are faster than the disk I/O. If two or more keys point to the same leaf page, the disk I/O operation can be saved, to a large extent, as one data block write and multiple data block reads (path searching).

The storage engine 106 can contain a processor, which includes but not limited to, hardware Central Processing Unit (CPU), Field Programmable Gate Array (FPGA), Complex Programmable Logical Device (CPLD), Application-Specific Integrated Circuit (ASIC), System-on-Chip (SOC) or combinations thereof.

The storage device 108 is used for storing the metadata outputted from the device 102 and also can provide the metadata for the device 102 after receiving a read request sent from the device 102.

The schematic diagram of the example environment where the device and/or the method according to embodiments of the present disclosure can be implemented has been described above with reference to FIGS. 1 and 2. A method for storing the metadata according to the present disclosure is described in details below with reference to FIGS. 3 and 4.

The device 102 forms the obtained metadata item and the keyword corresponding to the metadata item into a key-value pair for storage. The key-value pair stored in the memory 104, when meeting a predetermined condition, is stored in the storage device 108. In one example, when the number of stored key-value pairs reaches a threshold number, the key-value pairs within the memory 104 are stored in the storage device 108. In another example, if the memory 104 lacks sufficient storage space for storing the new key-value pairs, the key-value pairs within the memory 104 are stored in the storage device 108. The above examples are provided only for the purpose of describing the present disclosure, rather than specifically restricting it. Accordingly, the key-value pairs within the memory 104 can be stored in the storage device 108 based on any suitable conditions.

Figure 3:
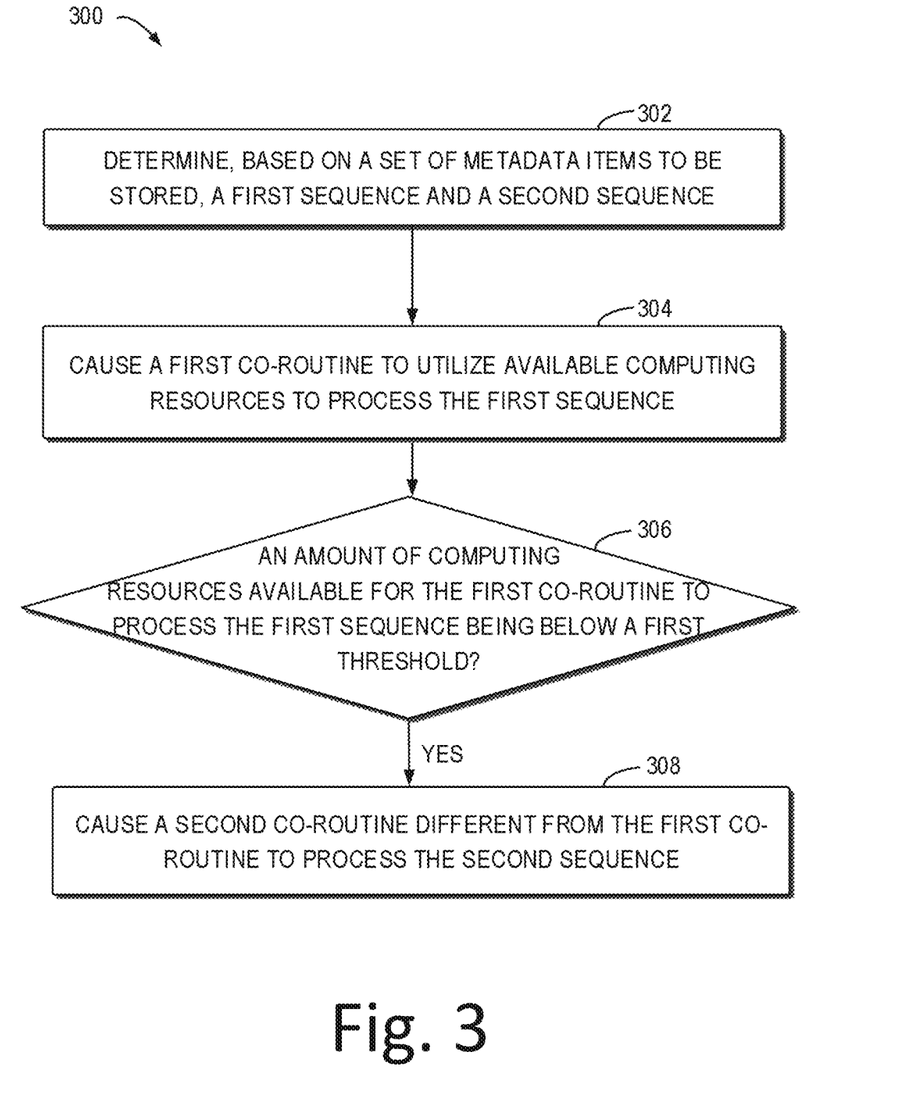
FIG. 3 illustrates a schematic diagram of a method 300 for storing metadata in accordance with embodiments of the present disclosure.

At block 302, a first sequence and a second sequence are determined based on a set of metadata items to be stored, wherein the terms "first", "second" and so on can refer to same or different objects. In the examples of the present disclosure, other sequences also can exist. The first sequence and the second sequence are two of the plurality of sequences. Each sequence each includes a plurality of key-value pairs and each key-value pair contains one metadata item in the set and a keyword corresponding to the metadata item. In one example, a plurality of key-value pairs corresponding to the set of the metadata items is divided into a plurality of sequences, wherein the plurality of key-value pairs is sorted based on the keys therein. The above examples are provided only for the purpose of explaining the present disclosure, rather than specifically restricting it. The key-value pairs can be stored based on the requirements in any suitable ways.

In one example, the plurality of key-value pairs corresponding to the set of the metadata items is averaged. In this case the key-value pairs in each sequence are the same. In a further example, the plurality of key-value pairs can be divided based on any suitable rules.

At block 304, the first co-routine is caused to use the available computing resources to process the first sequence. When the first sequence is allocated to the first co-routine, the first co-routine processes the key-value pairs of the first sequence to store them in the storage device 108. The first co-routine can be any one of the plurality of co-routines. The above example is provided only for the purpose of describing the present disclosure, rather than specifically restricting it.

It is determined, at block 306, that an amount of the computing resources available for the first co-routine to process the first sequence are below a first threshold. In one example, if the first co-routine processes the Input/Output operations associated with the first sequence for the storage device, it means that the computing resources utilized by the first co-routine are below a first predetermined threshold. In this situation, other co-routines can be called to process another sequence. In another example, in response that the number of Input/Output operations associated with the first sequence processed by the first co-routine exceeds a threshold number, it is determined that the computing resources used by the first co-routine are below the first threshold. The above examples are provided only for the purpose of describing the present disclosure, rather than specifically restricting it. Any suitable ways can be used based on the requirements to determine whether the computing resources of the first co-routine are below the first threshold.

If the amount of the computing resources available for the first co-routine to process the first sequence is below a first threshold, a second sequence is processed by a second co-routine different from the first co-routine at block 308. Alternatively or additionally, the first co-routine is caused to cease processing the first sequence. A procedure of processing the data by two co-routines will be explained below with reference to FIG. 4. It should be noted that the above examples are provided only for the purpose of explaining the present disclosure, rather than restricting it. Any number of co-routines can be used for the present disclosure.

Figure 4:
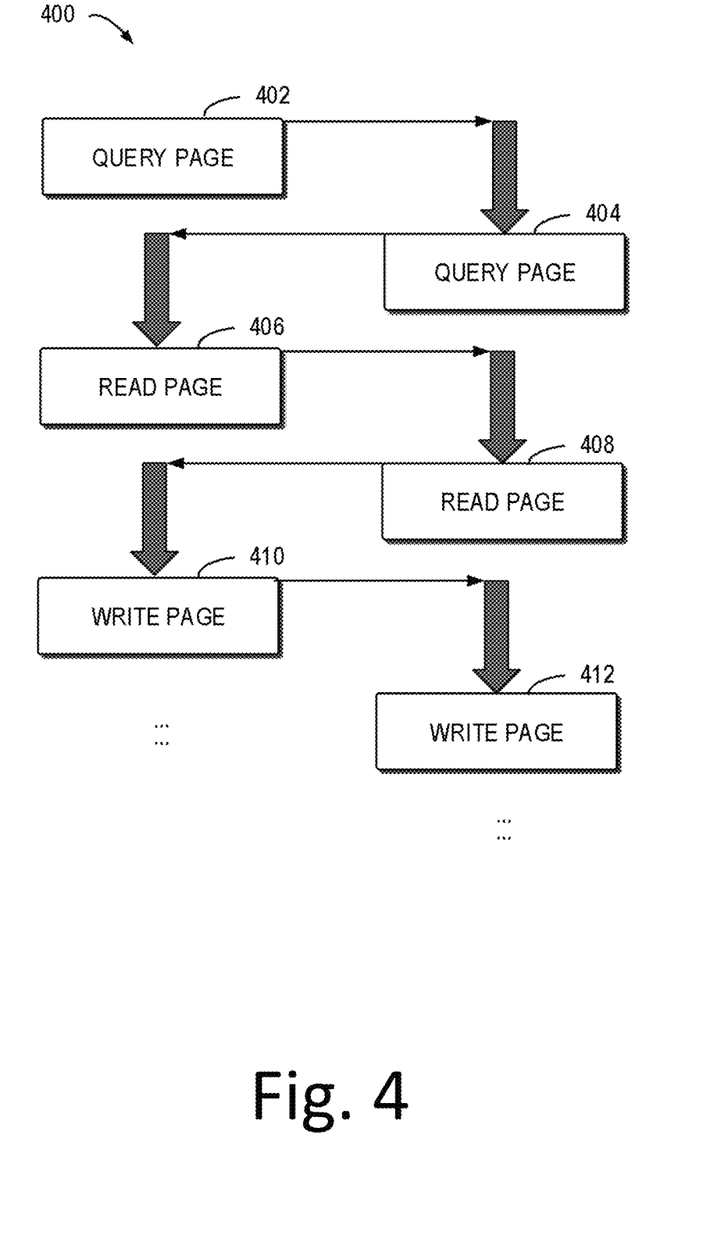
FIG. 4 illustrates a schematic diagram of an example 400 for describing co-routine operation in accordance with embodiments of the present disclosure.

FIG. 4 illustrates a schematic diagram of an example 400 for describing the co-routine operation in accordance with embodiments of the present disclosure. As shown in FIG. 4, the first co-routine performs blocks 402, 406 and 410 while the second co-routine performs the blocks 404, 408 and 412. If the first co-routine reads the data blocks in the pages from the storage device 108 (query page) at block 402 or block 406, it means that the amount of the computing resources used by the first co-routine is below the first predetermined threshold, and the second co-routine is called for processing the sequences of other key-value pairs. If the first co-routine writes data into the pages in the storage device 108 at block 410, it demonstrates that the amount of the computing resources used by the first co-routine is below the first predetermined threshold and the second co-routine is called for processing the sequences of other key-value pairs. Likewise, when executing blocks 404, 408 and 412, the second co-routine also calls the first co-routine for processing. The above examples are provided only for the purpose of describing the present disclosure, rather than specifically restricting it. At the presence of a plurality of sequences and a plurality of co-routines, any other suitable co-routine can be determined as the second co-routine based on the requirements or a preset rule.

In one example, when the second co-routine is called for processing the key-value pair sequence, it is required to confirm whether the second co-routine has completed the Input/Output operations for the storage device 108. The second co-routine can utilize the computing resources for data processing only when it has completed the Input/Output operations. The above examples are provided only for the purpose of describing the present disclosure, rather than specifically restricting it. The condition for executing the second co-routine can be set based on the requirements.

Alternatively or additionally, when the amount of the computing resources available for the first co-routine to process the first sequence exceeds the first threshold, the first co-routine can continue to process the first sequence. Therefore, the computing resources are rationally utilized by the call between the co-routines.

During the executing of the procedure 300 for storing the metadata, when the first co-routine is inputting/outputting the data, the second co-routine can be called, to utilize the computing resources to process data. The above operation improves the utilization rate of the computing resources and accelerates the speed for storing the metadata into the external storage device, which accordingly enhances the data processing capability of the entire storage system.

The procedure of storing the metadata has been described above with reference to FIGS. 3 and 4. A procedure of storing the metadata via the co-routines will be described in details below with reference to FIGS. 5, 6 and 7.

Figure 5:
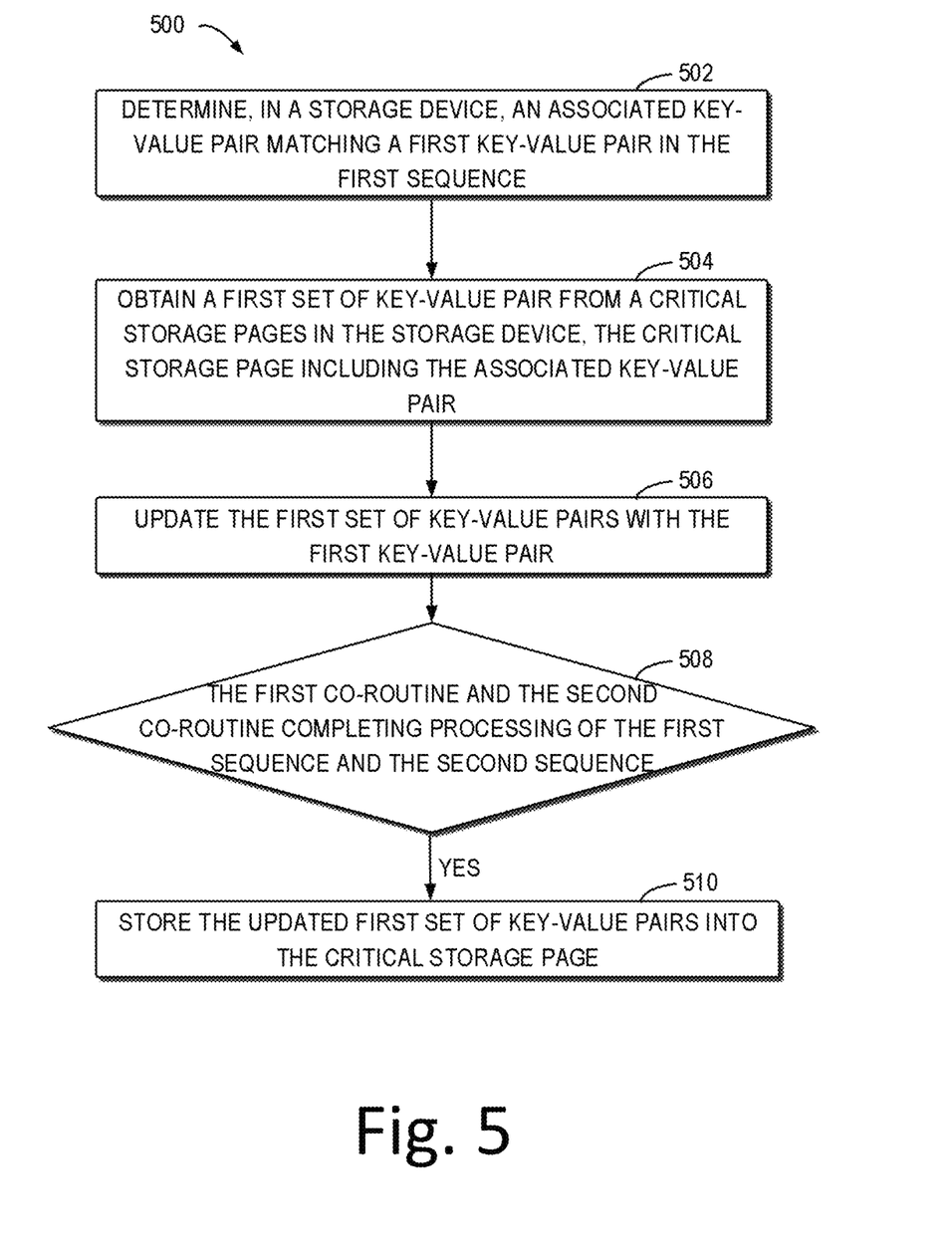
FIG. 5 illustrates a schematic diagram of a procedure 500 for storing the metadata in accordance with embodiments of the present disclosure.

FIG. 5 illustrates a schematic diagram of a procedure 500 for storing the metadata in accordance with embodiments of the present disclosure. In the embodiment illustrated by FIG. 5, the co-routine receives an allocated sequence to be processed. The key-value pairs in the sequence are processed and stored into the storage device.

An associated key-value pair in the storage device matching with a first key value pair in the first sequence is determined at block 502. A first keyword in the first key-value pair matches a second keyword in the associated key value pair.

In one example, the associated key-value pair is a key-value pair stored in the storage device and has the keyword in the first key-value pair, i.e., the first keyword is identical to the second keyword. In another example, the associated key-value pair is a key-value pair stored in the storage device and has a keyword close to the keyword in the first key-value pair, i.e., the first keyword is close to the second keyword. The above examples are provided only for the purpose of explaining the present disclosure, rather than restricting it. The second keyword matching with the first keyword can be determined in any suitable ways based on the requirements.

Alternatively or additionally, if the key-value pair for the metadata item is stored in the form of a tree structure. For example, the tree structure can be B+tree or B−tree. The associated key-value pair includes a key-value pair matching a key of the first key-value pair in the leaf page for storing the metadata and also includes a key-value pair matching the key of the first key-value pair in all index pages which have been gone through during the procedure of finding the leaf page.

Figure 7:
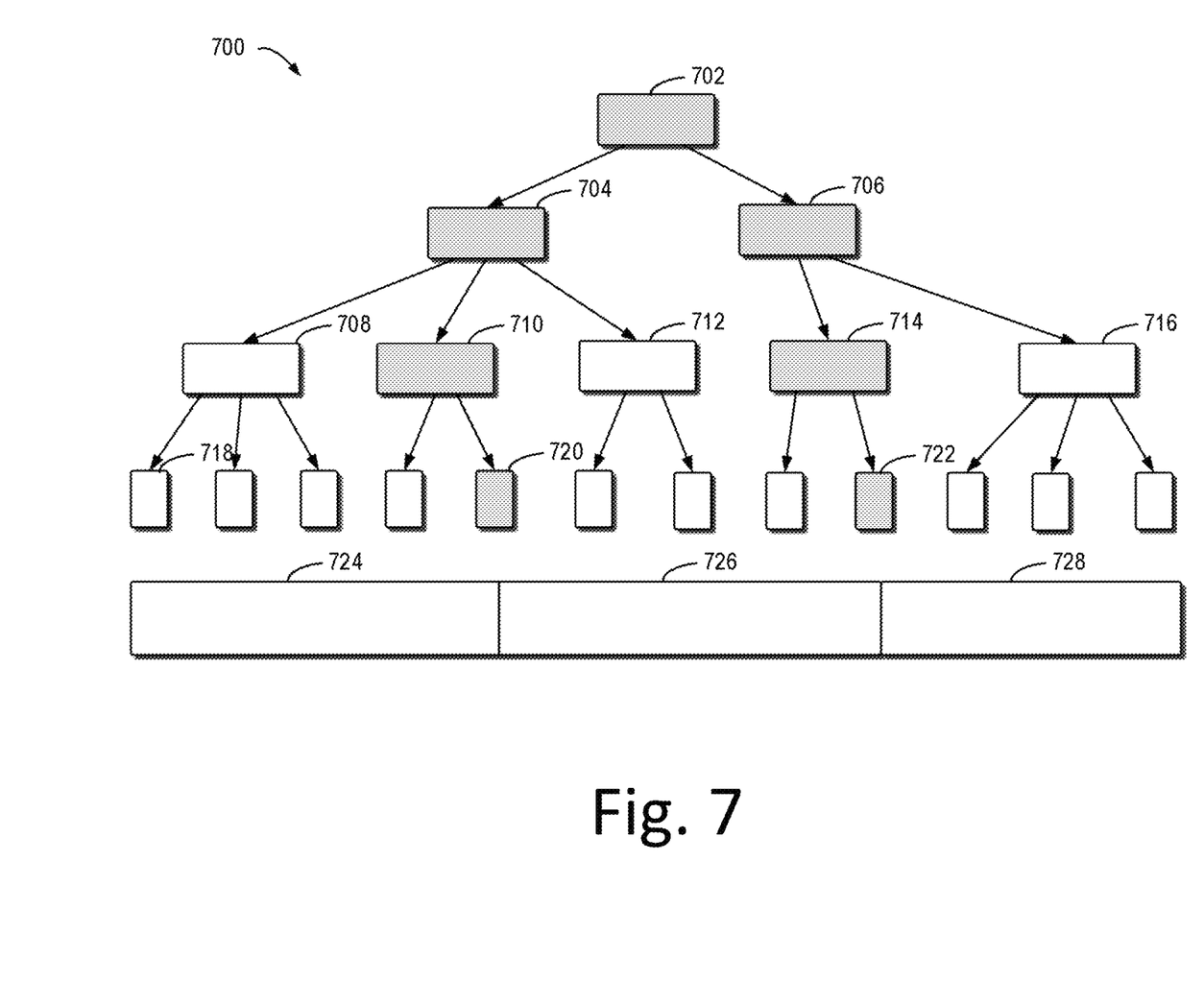
FIG. 7 illustrates a schematic diagram of an example 700 for describing storage positions of metadata in accordance with embodiments of the present disclosure.

As illustrated in FIG. 7, the storage structure of the key-value pairs for the metadata items has been described by taking the B+ tree as the example. In FIG. 7 there are a root page 702, index pages 704, 706, 708, 710, 712, 714 and 716, and underlying leaf pages including leaf pages 718, 720 and 722. The leaf pages are used for storing the key-value pairs including the metadata. The root page 702 and the index pages 704, 706, 708, 710, 712, 714 and 716 store an index mapping to the leaf page.

Key-value pairs to be stored for the metadata in the computing device 102 can be divided into a plurality of sequences. The key-value pairs to be stored for the metadata items in FIG. 7 are divided into three sequences 724, 726 and 728. The above examples are provided only for the purpose of explaining the present disclosure, rather than restricting it. Any suitable number of sequences can be set based on the requirements.

Associated key values matching the first key-value pair of the sequence 724 exist on the leaf page 718, the index pages 708 and 704 and the root page 702. Associated key-value pairs matching the first key value pair of the sequence 726 are present on the leaf page 720, the index pages 710 and 704 and the root page 702. Associated key-value pairs matching the first key value pair of the sequence 728 exist on the leaf page 722, the index pages 714 and 706 and the root page 702.

A first set of key-value pair from the critical storage pages in the storage device is obtained at block 504, wherein the critical storage pages includes the associated key-value pair. In one example, the page having the associated key-value pair is marked as critical page. The stored first set of key-value pairs is acquired from the above critical page. Alternatively or additionally, since the page where the associated key-value pair for the first key-value pair in the first sequence belongs is not used by other co-routines, the co-routine processing the first sequence may not mark the page where the associated key-value pair belongs as critical page.

According to FIG. 7, pages 720, 722, 710, 714, 704, 706 and 702 associated with the second sequence 726 and the third sequence 728 are marked as critical pages. The first set of key-value pairs is obtain from the pages 720, 722, 710, 714, 704, 706 and 702 whereas the pages 718 and 708 associated with the first sequence 724 are not marked as critical pages.

The first set of key-value pairs is updated with the first key-value pair at block 506. When the first set of key-value pairs associated with the first key-value pair is determined, the first set of key-value pairs is updated with the first key-value pair and the update operation includes insertion, modification and deletion.

Because the first set of key-value pairs of the critical pages for the first key-value pair in one co-routine may be used by another co-routine, the co-routines, when processing the metadata, do not adjust the size of the first set of key-value pair in the critical storage pages, i.e., not dividing or combining the first set of key-value pairs in the critical pages. Meanwhile, the co-routines do not store the first set of key-value pairs in the critical storage pages into the storage device 108.

It is determined, at block 508, that the first co-routine and the second co-routine complete the processing of the first sequence and the second sequence. Alternatively or additionally, if a plurality of sequences is processed by a plurality of co-routines, it is required to determine that each of the plurality of co-routines completes the processing of the allocated sequences.

If the first co-routine and the second co-routine complete the processing of the first sequence and the second sequence, the updated first set of key-value pairs is stored into the critical storage pages at block 510.

When the first set of key-value pairs for the critical storage pages is stored, it is firstly determined whether the size of the first set of key-value pairs is adjusted. In one example, it is judged whether the data amount of the updated first set of key-value pairs t for the critical storage pages is between the data amount of the first page and the data amount of the second page. If the data amount of the updated first set of key-value pairs exceeds the data amount of the first page, it is required to divide the updated first set of key-value pairs. If the data amount of the updated first set of key-value pairs is below the data amount of the second page, it is required to combine the key-value pair set. The above examples are provided only for the purpose of explaining the present disclosure, rather than specifically restricting it. Conditions for adjusting the size of the key-value pair set and a threshold amount for adjustment can be set based on the requirements.

In one example, if the co-routines for all sequences complete the corresponding operations, the updated key-value pair sets for the critical storage pages in each co-routine are stored into the storage device. In one example, the key-value pair set for the metadata is firstly stored into the leaf critical storage pages during the procedure of storing the key-value pair set. Additionally or alternatively, the position of the leaf critical storage page is different from the position when the key-value pair set is read. Afterwards, the address of the leaf critical page is returned to the storage engine 106 for updating a first-level index page associated with the leaf page. When the first-level index page associated with the leaf page is updated, the first-level index page is stored and a second-level index page is updated with the address of the first-level index page until all pages are stored.

During the above procedure, a shared key-value pair set, which may be used by two co-routines, is stored in the memory 104 rather than being read from the external storage device respectively. This operation ensures the consistency of data processing. Moreover, the operation enables the co-routine to know that the key-value pair set has been processed by another co-routine, which avoids the inconsistency issue of information processing.

The processing of the first key-value pair in the sequence has been described above with reference to FIGS. 5 and 7. The processing of other key-value pairs in the sequence will be described below with reference to FIGS. 6 and 7.

Figure 6:
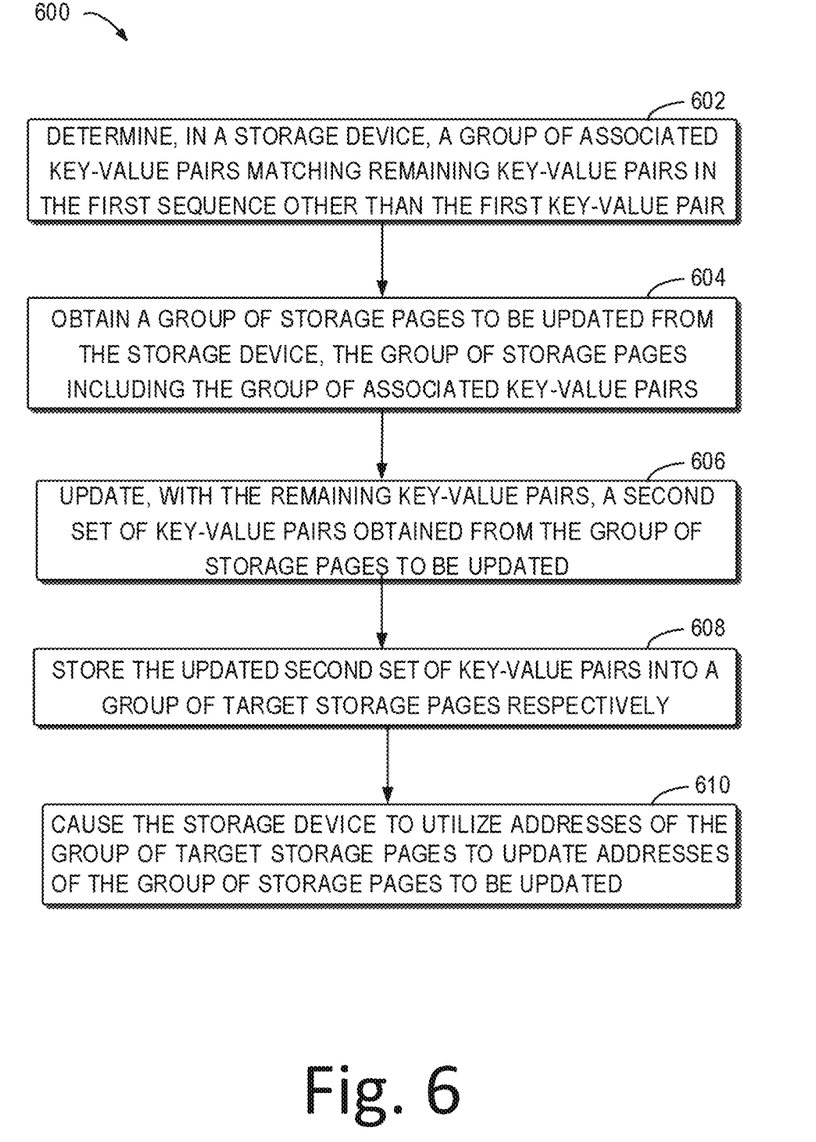
FIG. 6 illustrates a schematic diagram of a further procedure 600 for storing the metadata in accordance with embodiments of the present disclosure.

When the key-value pairs in the sequence are processed, a group of associated key-value pairs in the storage device matching the remaining key-value pairs in the first sequence other than the first key value pair are determined at block 602. The keywords in the remaining key-value pairs respectively match with the keywords in the group of associated key-value pairs. Alternatively or additionally, if a key-value pair set corresponding to a certain key value pair in the sequence is saved in the memory 104, the associated key-value pair can be determined from the key-value pair set stored in the memory 104.

At block 604, a group of storage pages to be updated from the storage device are obtained, where the group of storage gapes includes a group of associated key-value pairs, and the group of storage pages to be updated excludes the critical storage pages. If the key-value pairs in the group of associated key-value pairs are located on the critical storage pages, new storage pages are no longer required. If the key-value pairs in the group of associated key-value pairs are not located on the critical storage pages, it is required to determine a group of storage pages to be updated.

At block 606, the key-value pair set obtained from the group of storage pages to be updated is updated with the remaining key-value pairs. In one example, the key-value pairs of the remaining key-value pairs not on the critical pages are used to update the key-value pair sets obtained from the group of storage pages to be updated. The critical pages are directly updated using the key-value pairs of the remaining key-value pairs on the critical pages.

At block 608, the updated key-value pair sets are respectively stored into a group of target storage pages. In one example, since the updated key-value pair sets are not key-value pair sets of the critical pages, it can be judged whether the data amount of the updated key-value pair sets is between the data amount of the first page and the data amount of the second page after the update is finished. If the data amount of the updated key-value pair sets exceeds the data amount of the first page, it is required to divide the key-value pair sets. If the data amount of the updated key-value pair sets is below the data amount of the second page, it is required to combine the key-value pair sets. The above examples are provided only for the purpose of explaining the present disclosure, rather than specifically restricting it. Conditions for adjusting the size of the key-value pair set and a threshold amount for adjustment can be set based on the requirements.

In one example, the updated key-value pair sets are stored in a queue. If the amount of the updated key-value pair sets exceeds a threshold amount, the updated key-value pair sets are flushed to the external storage device.

At block 610, the storage device is caused to utilize addresses of a group of target storage pages to update addresses of a group of storage pages to be updated. When the updated key-value pair sets are stored into the group of target pages, the corresponding metadata are stored in these target data pages. In order to keep data consistency, the addresses of the storage pages to be updated in the storage device are updated as addresses of the target storage pages. In one example, if the page is stored in a tree-structure, the updated key-value pair sets associated with the leaf page are firstly flushed to the target data pages during the procedure of storing the updated key-value pair sets. Then, the addresses of the target data pages are returned to the storage engine 106, which updates a first layer of an index page with the addresses and then stores the first layer of the index page. Afterwards, a second layer of the index page is updated with the address of the first layer of the index page and the storage pages at each layer are sequentially stored. The storage procedure is finally completed.

The above storage procedure can store the data in the non-critical pages directly into the storage device without coordination between the co-routines, which accelerates the procedure of data storage and enhances the storage efficiency.

Figure 8:
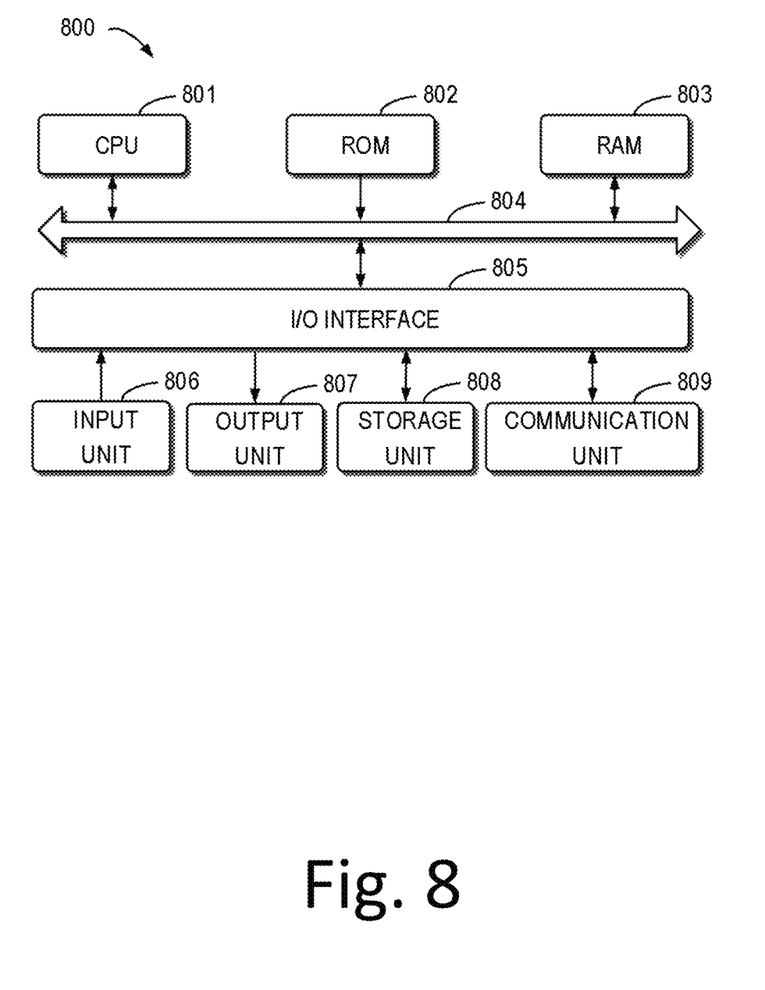
FIG. 8 illustrates a schematic block diagram of an example device 800 for implementing embodiments of the present disclosure.

FIG. 8 illustrates a schematic block diagram of an example device 800 for implementing embodiments of the present disclosure. For example, any one of 102, 104, and 106 shown in FIG. 1 can be performed by the device 800. As shown, the device 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as disk, optical disk etc.; and a communication unit 809, such as network card, modem, wireless transceiver and the like. The communication unit 809 allows the device 800 to exchange information/data with other devices via the computer network, such as Internet, and/or various telecommunication networks.

The above described various procedures and processing, such as methods 300, 500 and 600, can be executed by the processing unit 801. For example, in some embodiments, methods 300, 500 and 600 can be implemented as computer software programs tangibly included in the machine-readable medium, such as storage unit 808. In some embodiments, the computer program can be partially or fully loaded and/or mounted to the device 800 via ROM 802 and/or communication unit 809. When the computer program is loaded to RAM 803 and executed by the CPU 801, one or more actions of the above described methods 300, 500 and 600 can be executed.

The present disclosure provide a method, a device and/or a computer program product. The computer program product can include a computer-readable storage medium loaded with computer-readable program instructions for executing various aspects of the present disclosure.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram can be implemented by the computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable other ordinary skilled in the art to understand embodiments of the present disclosure.

We claim:

1. A method of storing metadata, the method comprising:
identifying, by a system comprising a processor and based on a set of metadata items to be stored, a first group of key-value pairs and a second group of key-value pairs, each key-value pair including a metadata item from the set of metadata items and a keyword corresponding to the metadata item;
causing a first co-routine to utilize available computing resources to process the first group of key-value pairs to store the first group of key-value pairs in a storage device; and
in response to an amount of computing resources available for the first co-routine to process the first group of key-value pairs being below a first threshold amount of available computing resources, causing a second co-routine to process the second group of key-value pairs to store the second group of key-value pairs in the storage device wherein the second co-routine is different from the first co-routine.

2. The method of claim 1, further comprising:
in response to a number of Input/Output operations associated with the first group of key-value pairs and processed by the first co-routine exceeding a threshold number of Input/Output operations, determining that the amount of computing resources used by the first co-routine is below the first threshold amount of available computing resources.

3. The method of claim 1, further comprising:
in response to the amount of computing resources available for the first co-routine to process the first group of key-value pairs being below the first threshold amount of available computing resources, causing the first co-routine to stop processing the first group of key value pairs.

4. The method of claim 3, further comprising:
in response to the amount of computing resources available for the first co-routine to process the first group of key-value pairs exceeding the first threshold amount of available computing resources, causing the first co-routine to continue the processing of the first group of key-value pairs.

5. The method of claim 1, wherein the causing the first co-routine to process the first group of key-value pairs comprises causing the first co-routine to:
determine, in a storage device, an associated key-value pair matching a first key-value pair in the first group of key-value pairs, a first keyword in the first key-value pair matching a second keyword in the associated key-value pair;
obtain a first set of key-value pairs from a critical storage page in the storage device, the critical storage page including the associated key-value pair;
update the first set of key-value pairs with the first key-value pair, resulting in an updated first set of key-value pairs; and
in response to the first co-routine and the second co-routine completing processing of the first group of key-value pairs and the second group of key-value pairs, store the updated first set of key-value pairs into the critical storage page.

6. The method of claim 5, wherein the causing the first co-routine to process the first group of key-value pairs comprises causing the first co-routine to:
determine, in a storage device, a group of associated key-value pairs matching remaining key-value pairs in the first group of key-value pairs other than the first key-value pair, keywords in the remaining key-value pairs matching keywords in the group of associated key-value pairs respectively;
obtain a group of storage pages to be updated from the storage device, the group of storage pages including the group of associated key-value pairs and excluding the critical storage page;
update, with the remaining key-value pairs, a second set of key-value pairs obtained from the group of storage pages to be updated, resulting in an updated second set of key-value pairs;
store the updated second set of key-value pairs into a group of target storage pages respectively; and
cause the storage device to utilize addresses of the group of target storage pages to update addresses of the group of storage pages to be updated.

7. An electronic device for storing metadata, comprises:
a processor; and
a memory having computer program instructions stored thereon, the processor executing the computer program instructions in a memory to control the electronic device to perform acts comprising:
identifying, based on a set of metadata items to be stored, a first plurality of key-value pairs and a second plurality of key-value pairs, each key-value pair including a metadata item from the set of metadata items and a keyword corresponding to the metadata item;
causing a first co-routine to utilize available computing resources to process the first plurality of key-value pairs to store the first plurality of key-value pairs in a storage device; and
in response to an amount of computing resources available for the first co-routine to process the first plurality of key-value pairs being below a first threshold amount of available computing resources, causing a second co-routine to process the second plurality of key-value pairs to store the second plurality of key-value pairs in the storage device, wherein the second co-routine is different from the first co-routine.

8. The electronic device of claim 7, wherein the actions further comprise:
in response to a number of Input/Output operations associated with the first plurality of key-value pairs and processed by the first co-routine exceeding a threshold number of Input/Output operations, determining that the amount of computing resources used by the first co-routine is below the first threshold amount of available computing resources.

9. The electronic device of claim 7, wherein the actions further comprise:
in response to the amount of computing resources available for the first co-routine to process the first plurality of key-value pairs being below the first threshold amount of available computing resources, causing the first co-routine to stop processing the first plurality of key-value pairs.

10. The electronic device of claim 9, wherein the actions further comprise:
in response to the amount of computing resources available for the first co-routine to process the first plurality of key-value pairs exceeding the first threshold amount of available computing resources, causing the first co-routine to continue the processing of the first plurality of key-value pairs.

11. The electronic device of claim 7, wherein the causing the first co-routine to process the first plurality of key-value pairs comprises causing the first co-routine to:
determine, in a storage device, an associated key-value pair matching a first key-value pair in the first plurality of key-value pairs, a first keyword in the first key-value pair matching a second keyword in the associated key-value pair;
obtain a first set of key-value pairs from a critical storage page in the storage device, the critical storage page including the associated key-value pair;
update the first set of key-value pairs with the first key-value pair, resulting in an updated first set of key-value pairs; and
in response to the first co-routine and the second co-routine completing processing of the first plurality of key-value pairs and the second plurality of key-value pairs, storing the updated first set of key-value pairs into the critical storage page.

12. The electronic device of claim 7, wherein the causing the first co-routine to process the first plurality of key-value pairs comprises causing the first co-routine to:
determine, in a storage device, a group of associated key-value pairs matching remaining key-value pairs in the first plurality of key-value pairs other than the first key-value pair, keywords in the remaining key-value pairs matching keywords in the group of associated key-value pairs respectively;
obtain a group of storage pages to be updated from the storage device, the group of storage pages including the group of associated key-value pairs and excluding the critical storage page;
update, with the remaining key-value pairs, a second set of key-value pairs obtained from the group of storage pages to be updated, resulting in an updated second set of key-value pairs;
store the updated second set of key-value pairs into a group of target storage pages respectively; and
cause the storage device to utilize addresses of the group of target storage pages to update addresses of the group of storage pages to be updated.

13. A computer program product being stored on a non-transitory computer-readable medium and comprising machine-executable instructions which, when executed, cause a machine to perform operations, comprising:
identifying, based on metadata items to be stored, a first group of key-value pairs and a second group of key-value pairs, each key-value pair including a metadata item from the metadata items and a keyword corresponding to the metadata item;
causing a first co-routine to utilize available computing resources to process the first group of key-value pairs to store the first group of key-value pairs in a storage device; and
in response to an amount of computing resources available for the first co-routine to process the first group of key-value pairs being below a first threshold amount of available computing resources, causing a second co-routine to process the second group of key-value pairs to store the second group of key-value pairs in the storage device, wherein the second co-routine is different from the first co-routine.

14. The computer program product of claim 13, wherein the operations further comprising:
in response to a number of Input/Output operations associated with the first group of key-value pairs and processed by the first co-routine exceeding a threshold number of Input/Output operations, determining that the amount of computing resources used by the first co-routine is below the first threshold amount of available computing resources.

15. The computer program product of claim 13, wherein the operations further comprise:
in response to the amount of computing resources available for the first co-routine to process the first group of key-value pairs being below the first threshold amount of available computing resources, causing the first co-routine to stop processing the first group of key-value pairs.

16. The computer program product of claim 15, wherein the operations further comprise:
in response to the amount of computing resources available for the first co-routine to process the first group of key-value pairs exceeding the first threshold amount of available computing resources, causing the first co-routine to continue the processing of the first group of key-value pairs.

17. The computer program product of claim 13, wherein the causing the first co-routine to process the first group of key-value pairs comprises causing the first co-routine to:
determine, in a storage device, an associated key-value pair matching a first key-value pair in the first group of key-value pairs, a first keyword in the first key-value pair matching a second keyword in the associated key-value pair; and
obtain a first set of key-value pairs from a critical storage page in the storage device, the critical storage page including the associated key-value pair.

18. The computer program product of claim 17, wherein the causing the first co-routine to process the first group of key-value pairs further comprises causing the first co-routine to:
update the first set of key-value pairs with the first key-value pair, resulting in an updated first set of key-value pairs; and
in response to the first co-routine and the second co-routine completing processing of the first group of key-value pairs and the second group of key-value pairs, store the updated first set of key-value pairs into the critical storage page.

19. The computer program product of claim 18, wherein the causing the first co-routine to process the first group of key-value pairs comprises causing the first co-routine to:
determine, in a storage device, a group of associated key-value pairs matching remaining key-value pairs in the first group of key-value pairs other than the first key-value pair, keywords in the remaining key-value pairs matching keywords in the group of associated key-value pairs respectively;
obtain a group of storage pages to be updated from the storage device, the group of storage pages including the group of associated key-value pairs and excluding the critical storage page; and update, with the remaining key-value pairs, a second set of key-value pairs obtained from the group of storage pages to be updated, resulting in an updated second set of key-value pairs.

20. The computer program product of claim 19, wherein the causing the first co-routine to process the first group of key-value pairs comprises causing the first co-routine to:
store the updated second set of key-value pairs into a group of target storage pages respectively; and
cause the storage device to utilize addresses of the group of target storage pages to update addresses of the group of storage pages to be updated.

\* \* \* \* \*